(12) United States Patent
Rothberg

(10) Patent No.: US 10,404,311 B2
(45) Date of Patent: Sep. 3, 2019

(54) WIRE MOBILE DEVICE CASE

(71) Applicant: Adam Rothberg, Aspen, CO (US)

(72) Inventor: Adam Rothberg, Aspen, CO (US)

( * ) Notice: Subject to any disclaimer, the term of this patent is extended or adjusted under 35 U.S.C. 154(b) by 0 days.

(21) Appl. No.: 16/032,702

(22) Filed: Jul. 11, 2018

(65) Prior Publication Data

US 2019/0020369 A1    Jan. 17, 2019

Related U.S. Application Data

(60) Provisional application No. 62/530,992, filed on Jul. 11, 2017.

(51) Int. Cl.
  *H04B 1/3888* (2015.01)
  *H04M 1/04* (2006.01)
  *H04M 1/02* (2006.01)
  *A45C 11/00* (2006.01)

(52) U.S. Cl.
  CPC ........ *H04B 1/3888* (2013.01); *H04M 1/0249* (2013.01); *H04M 1/04* (2013.01); *A45C 2011/002* (2013.01)

(58) Field of Classification Search
  CPC ............... B60R 22/1952; B60R 13/025; A61F 2002/9517
  USPC ......... 455/556.1, 575.6, 575.8; 297/464, 483
  See application file for complete search history.

(56) References Cited

U.S. PATENT DOCUMENTS 5,386,919 A * 2/1995 Long .................. B65D 9/16
                                              217/36
2015/0307061 A1* 10/2015 Chekaev ............. B60R 22/26
                                              297/483

* cited by examiner

*Primary Examiner* — Sam Bhattacharya
(74) *Attorney, Agent, or Firm* — Lathrop Gage LLP

(57) ABSTRACT

Case for devices includes corner pieces configured to be positioned at corners of a device. The corner pieces are retained in place by a wire passing there through and a tensioner attached to the wire. The device may be a mobile device or other device, such as a cuboid device.

19 Claims, 10 Drawing Sheets

TOP LEFT AND BOTTOM RIGHT

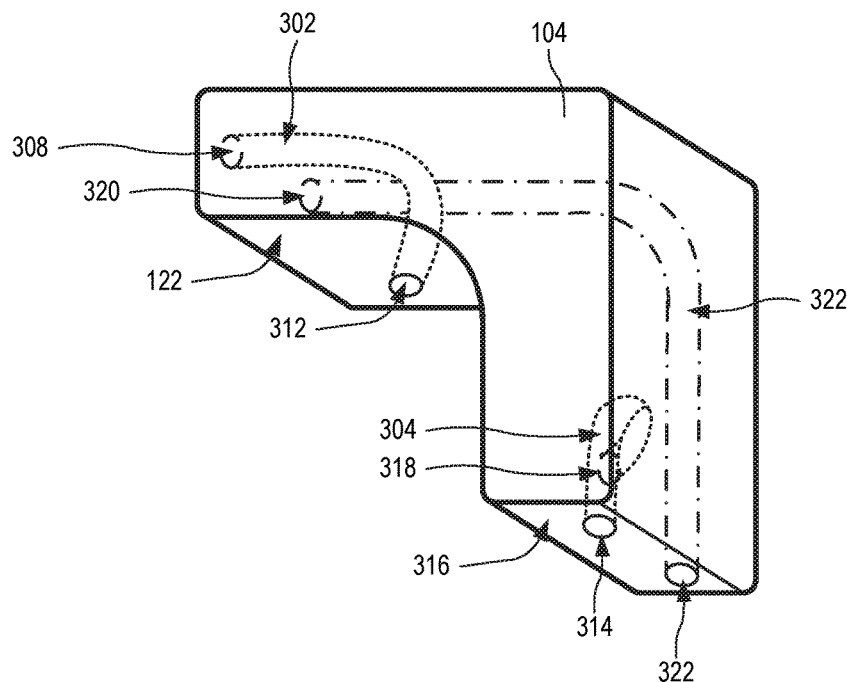
FIG. 7
TOP RIGHT
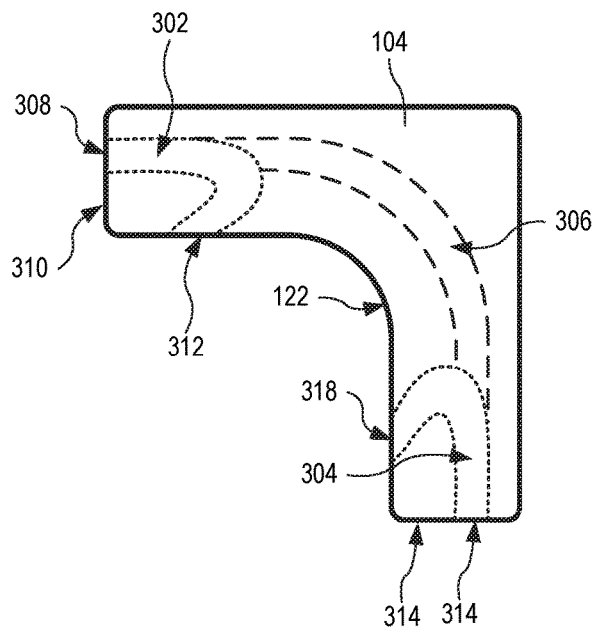 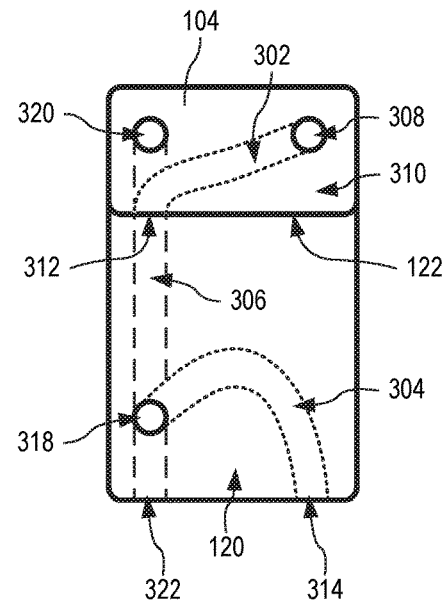
FIG. 8  FIG. 9

BOTTOM LEFT

NOT TO SCALE

NOT TO SCALE

WIRE MOBILE DEVICE CASE

RELATED APPLICATIONS

This application claims priority to U.S. Provisional Application Ser. No. 62/530,992, filed Jul. 11, 2017 and which is incorporated by reference herein in its entirety.

BACKGROUND

Mobile devices are now prevalent in our society. Many users desire to protect their mobile devices using cases or screen protectors. These cases, however, are often bulky and undesirable because they increase the size and/or weight of the mobile device.

SUMMARY

In a first aspect, a wire device case includes four corner pieces configured to be positioned at each corner of the device; a tensioner configured to be positioned at a back of the device and between the four corner pieces; and a single wire having a first end attached to the tensioner, passing through each of the four corner pieces, and having a second end captured and tensioned by the tensioner, the tensioned wire configured to create an inward force, with respect to the orientation of the four corner pieces, to retain the four corners on the device.

In certain embodiments of the first aspect, each of a first two of the four corner pieces are positioned opposing to one another having two channels therethrough, and the wire passes through each of the two channels of each of the first two corner pieces.

In certain embodiments of the first aspect, the channels are formed by a metal sleeve.

In certain embodiments of the first aspect, each of the other of the four corner pieces have three channels therethrough, and the wire passes through each of the three channels of each of the other two corner pieces.

In certain embodiments of the first aspect, the channels are formed by a metal sleeve.

In certain embodiments of the first aspect, the wire includes one or more materials selected from the group including copper, stainless steel, nickel, Kevlar, nylon, carbon fiber, plastic, and rubber.

In certain embodiments of the first aspect, the wire is woven from one or more materials.

In certain embodiments of the first aspect, the tensioner includes a stretchable material for applying an inward force to tension the wire.

In a second aspect, a wire cuboid object case comprises: eight corner pieces for positioning at each corner of a cuboid object; a tensioner positioned between any two of the eight corner pieces; and a wire passing through channels in each of the eight corner pieces and the tensioner, the tensioned wire creating an inward force, with respect to the orientation of the eight corner pieces, to retain the eight corners on the cuboid object.

In certain embodiments of the second aspect, each of the corner pieces has at least two channels.

In certain embodiments of the second aspect, the tensioner is a cleat.

In certain embodiments of the second aspect, the cleat includes teeth to releasably capture the wire within the cleat and maintain tension on the wire.

In certain embodiments of the second aspect, the wire passes through the cleat to form a loop, the cleat configured to tension the wire via adjustment of the loop size, during use.

In certain embodiments of the second aspect, the case further includes a second tensioner, and the wire passes through each of the two tensioners.

In certain embodiments of the second aspect, the loops for the first and second tensioners form a handle for carrying the cuboid object.

In certain embodiments of the second aspect, the wire has a single continuous length.

BRIEF DESCRIPTION OF THE FIGURES

FIG. 7 is a bottom-front perspective view of the top-tight corner piece of the wire mobile device case of FIGS. 1-3B, in an embodiment.

FIG. 8 is a front view of the top-right corner piece of FIG. 7.

FIG. 9 is a right side view of the top-right corner piece of FIGS. 7 and 8.

DETAILED DESCRIPTION OF THE EMBODIMENTS

Figures 1, 2:
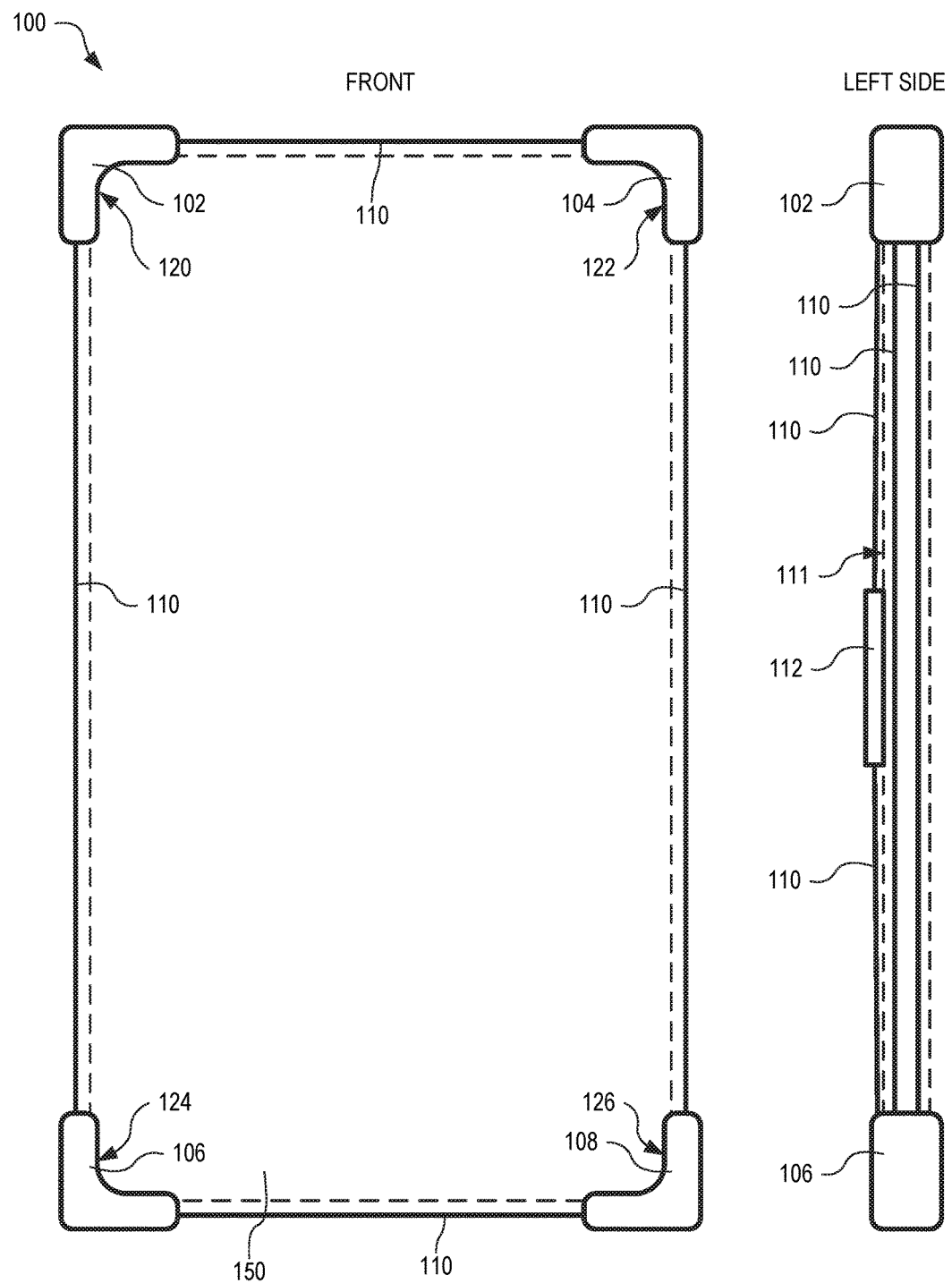
FIG. 1 shows a front view of one example wire mobile device case attached to a mobile device, in an embodiment.
FIG. 2 shows a left side view of the wire mobile device case of FIG. 1 attached to the mobile device.
Figure 3A:
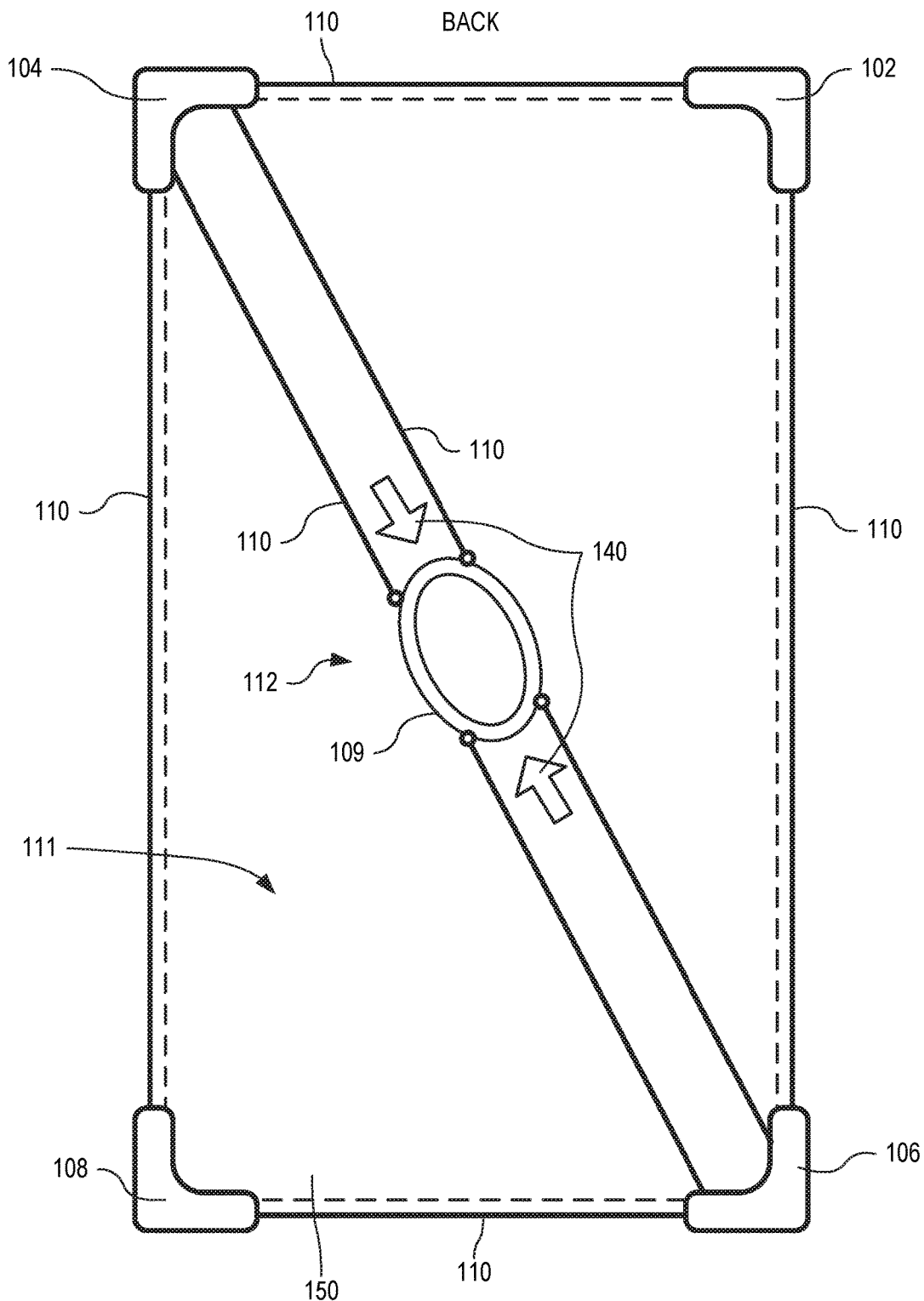
FIGS. 3A and 3B are each back views of the wire mobile device case of FIGS. 1 and 2 attached to a mobile device illustrating the tensioner of FIG. 2, in embodiments.
Figure 3B:
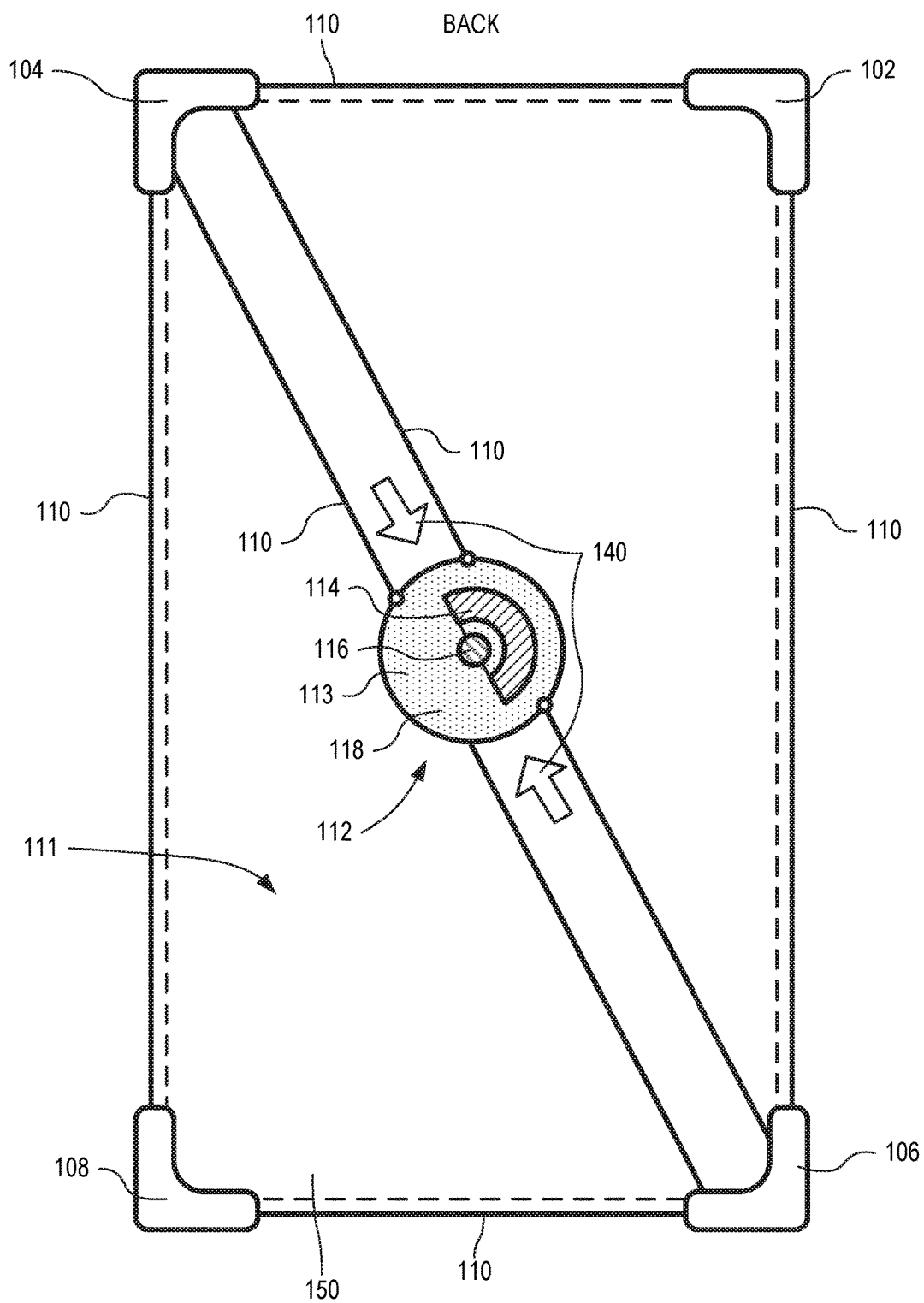

FIG. 1 shows one example wire mobile device case 100 attached to a mobile device 150 (shown in dashed outline). FIG. 2 shows a left side view of wire mobile device case 100 of FIG. 1 attached to mobile device 150. FIGS. 3A and 3B shows a back view of wire mobile device case 100 of FIGS. 1 and 2 attached to mobile device 150. FIGS. 1, 2 and 3 are best viewed together with the following description. Mobile device 150 is for example a cellphone, smartphone, personal digital assistant, music player, and so on.

Wire mobile device case 100 has four corner pieces 102, 104, 106, and 108, at least one wire 110 (or cord), and a tensioner 112 positioned towards a back surface 111 of mobile device 150. Wire 110 passes through channels within each corner piece 102, 104, 106, 108 and retains the corner pieces on mobile device 150 when tensioned by tensioner 112. In the embodiment shown, wire 110 passes twice through each corner piece 102 and 108, and thrice through each corner piece 104, and 106, such that wire 110 passes between adjacent corner pieces twice. As shown in FIG. 2, wire 110 makes two parallel runs between corresponding pairs of corner pieces 102, 104, 106 and 108. Corner pieces 102, 104, 106, 108, may be of any type of material, such as a metal, a rubber, and/or a plastic material. In certain embodiments, an inner corner surface 120, 122, 124, and 126 of each corner piece 102, 104, 106, and 108, respectively, may be recessed and/or otherwise shaped to fit corners of mobile device 150, and thereby facilitate retention of wire mobile device case 100 on mobile device 150. In other embodiments, corner pieces 102, 104, 106, 108, are formed of a malleable material such as a soft rubber, soft plastic, hard plastic, etc., wherein each corner piece 102, 104, 106, and 108 may conform to the shape of mobile device 150 when wire 110 is tensioned.

In certain embodiments, as shown in FIG. 3A, tensioner 112 is a semi-rigid ring 109 that applies a tension to wire 110. In other embodiments, tensioner 112 is a stretchable material such as one or more of an elastic ring, a band, a strap and a strip that applies tension to wire 110. In other embodiments, as shown in FIG. 3B, tensioner 112 is a ratchet type device 113 where a user turns a handle 114 around a pivot 116 relative to outer casing 118 that winds-in wire 110 to apply a tension. The ratchet mechanism prevents wire 110 from loosening unless manually operated through use of handle 114. In these embodiments, tensioner 112 provides an inward force, indicated by arrows 140, to wire 110.

Wire mobile device case 100, when attached to mobile device 150, provides protection from damage to corners (a most likely impact point when the mobile device is dropped), while being minimal and stylish.

Figure 4:
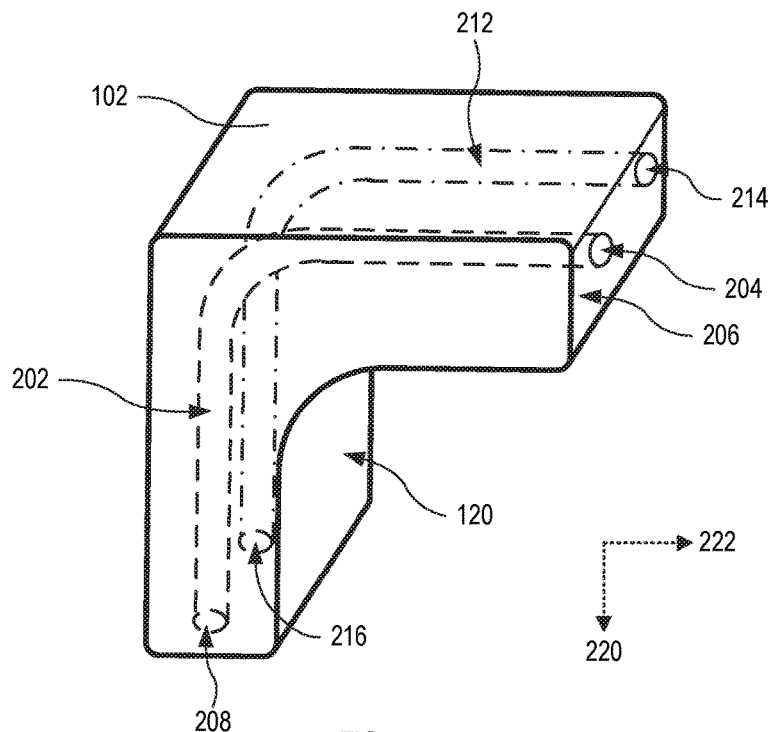
FIG. 4 is a top-front perspective view of the top-left corner piece of the wire mobile device case of FIGS. 1-3B illustrating two example channels for receiving the wire, in an embodiment.
Figure 5:
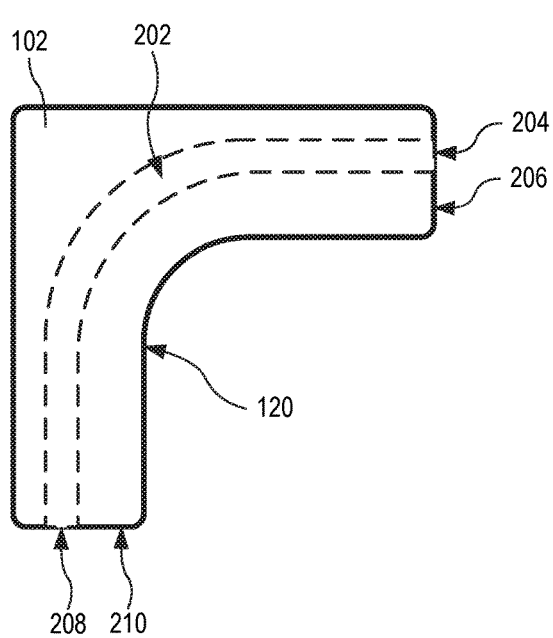
FIG. 5 is a front view of the top-left corner piece of FIG. 4.
Figure 6:
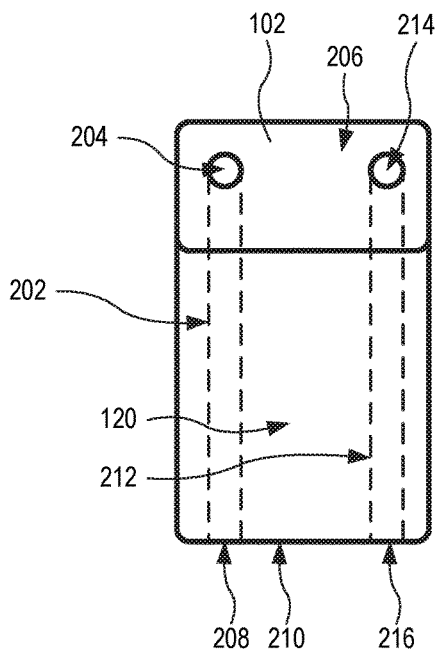
FIG. 6 is a left side view of the first corner piece of FIGS. 4 and 5.

FIG. 4 is a top-front perspective view of top-left corner piece 102 of FIGS. 1-3B, illustrating an example front channel 202 and an example rear channel 212, that each receive a different portion of wire 110. FIG. 5 is a front view of top-left corner piece 102 of FIG. 4. FIG. 6 is a right side view of top-left corner piece 102 of FIGS. 4 and 5. FIGS. 4-6 are best viewed together with the following description. In one embodiment, top-left corner piece 102 is substantially symmetrical. In another embodiment, top-left corner piece 102 is asymmetrical, having, one end longer than another end. In an example of the latter embodiment, top-left corner piece 102 is longer in direction 220 (defined as the direction perpendicular to the plane of aperture 208) than in direction 222 (defined as the direction perpendicular to the plane of aperture 204). Bottom-right corner piece 108 is substantially identical to top left corner piece 102; accordingly, bottom-right corner piece 108 is not separately described.

Front channel 202 is formed within top-left corner piece 102 between a first aperture 204 within a first end face 206 and a second aperture 208 within a second end face 210. Rear channel 212 is formed within top-left corner piece 102 between a third aperture 214 within first end face 206 and a fourth aperture 216 within second end face 210. Channels 202, 212 are curved and may have reduced friction to allow wire 110 to move therethrough easily. In certain embodiments, channels 202 and 212 are formed of a metal sleeve (or tube) that is molded into top-left corner piece 102.

FIG. 7 is a bottom-front perspective view of top-right corner piece 104 of FIGS. 1-3B, illustrating two example tension channels 302, 304 and an example rear channel 306, that each receive a different portion of wire 110. FIG. 8 is a front view of top-right corner piece 104 of FIG. 7. FIG. 9 is a right side view of top-right corner piece 104 of FIGS. 7 and 8. FIGS. 7-9 are best viewed together with the following description.

Tension channel 302 is formed within top-right corner piece 104 between a first aperture 308 within a first end face 310 and a second aperture 312 positioned towards a back of inner corner surface 122. Tension channel 304 is formed within top-right corner piece 104 between a third aperture 314 within second end face 316 and a fourth aperture 318 positioned towards the back of inner corner surface 122. Second aperture 312, fourth aperture 318, and tension channels 302 and 304 facilitate passage of wire 110 to tensioner 112. Channel 306 is formed between a fifth aperture 320 within first end face 310 and a sixth aperture 322 within second end face 316. Channels 302, 304, and 306 are curved and may have reduced friction to allow wire 110 to move therethrough easily. In certain embodiments, channels 302, 304, and 306 are formed of a metal sleeve (or tube) that is molded into top-right corner piece 104.

Figure 10:
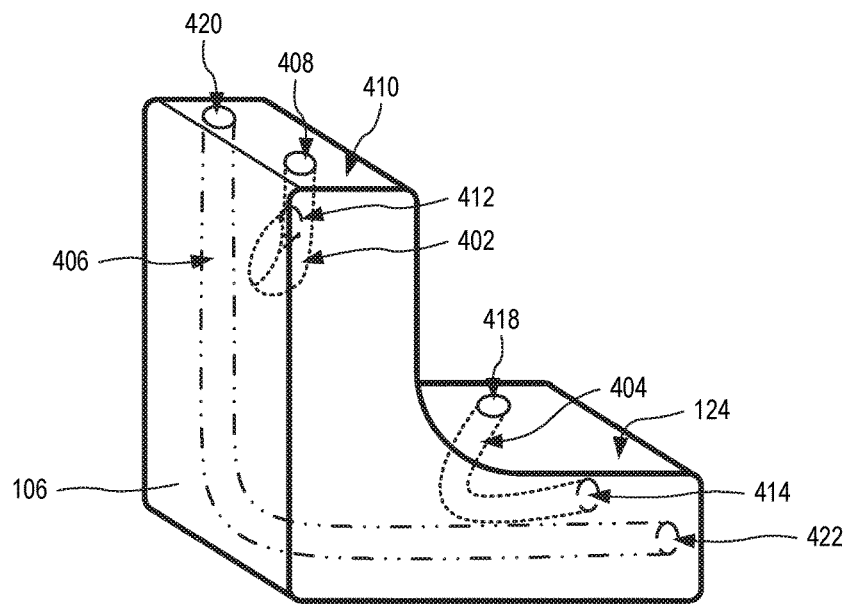
FIG. 10 is a top-front perspective view of the bottom-left corner piece of the wire mobile device case of FIGS. 1-3B.
Figure 11:
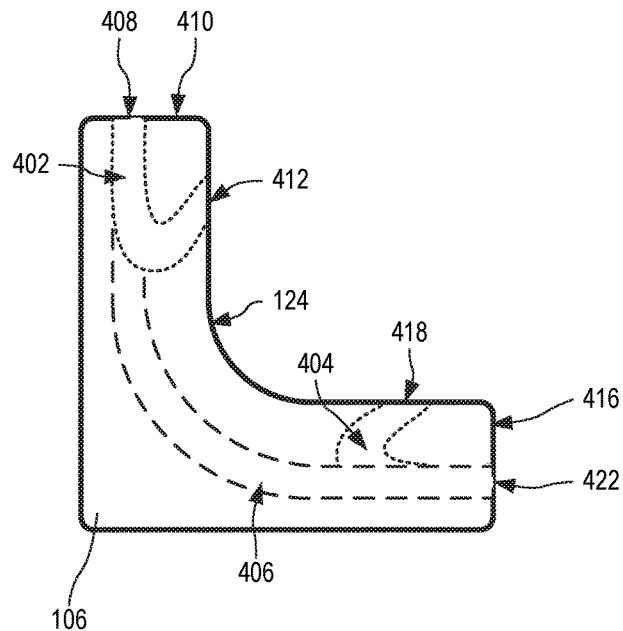
FIG. 11 is a front view of the bottom-left corner piece of FIG. 10.
Figure 12:
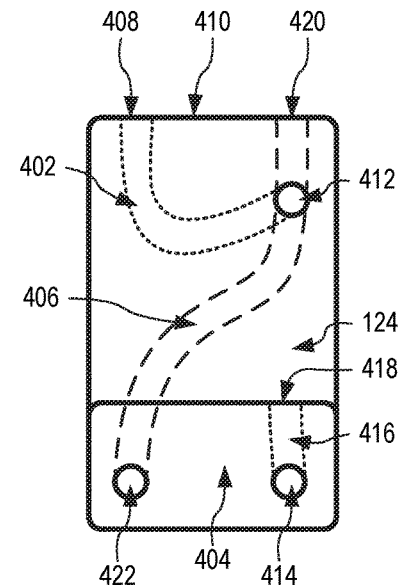
FIG. 12 is a right side view of the bottom-left corner piece of FIGS. 10 and 11.

FIG. 10 is a top-front perspective view of bottom-left corner piece 106 of FIGS. 1-3B, illustrating two example tension channels 402, 404 and an example switch channel 406, that each receive a different portion of wire 110. FIG. 11 is a front view of bottom-left corner piece 106 of FIG. 10. FIG. 12 is a right side view of bottom-left corner piece 106 of FIGS. 10 and 11. FIGS. 10-12 are best viewed together with the following description.

Tension channel 402 is formed within bottom-left corner piece 106 between a first aperture 408 within a first end face 410 and a second aperture 412 positioned towards a back of inner corner surface 124. Tension channel 304 is formed within bottom-left corner piece 106 between a third aperture 414 within second end face 416 and a fourth aperture 418 positioned towards the back of inner corner surface 124. Tension channels 402 and 404, and position of second aperture 412 and fourth aperture 418, facilitate passage of wire 110 to tensioner 112. Channel 406 is formed between a fifth aperture 420 within first end face 410 and a sixth aperture 422 within second end face 416. Channels 402, 404, and 406 are curved and may have reduced friction to allow wire 110 to move therethrough easily. In certain embodiments, channels 402, 404, and 406 are formed of a metal sleeve (or tube) that is molded into bottom-left corner piece 106.

When corner pieces 102, 104, 106 and 108 are positioned on mobile device 150 as shown in FIGS. 1-3B, first end surface 206 of top-left corner piece 102 faces first end face 310 of top-right corner piece 104, first aperture 204 aligns with first aperture 308, and third aperture 214 aligns with fifth aperture 320.

Figure 13:
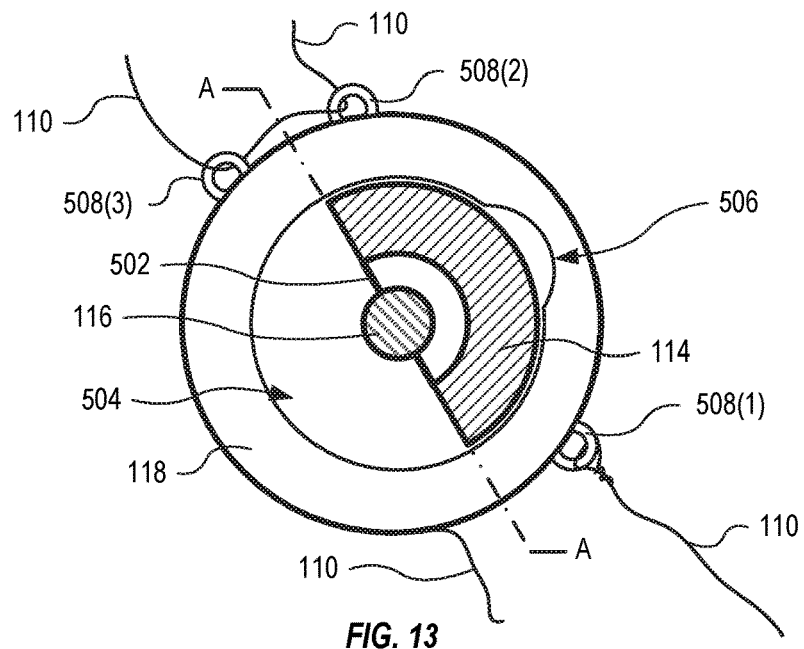
FIG. 13 shows the tensioner of the wire mobile device case of FIG. B in further example, detail illustrating connectivity to the wire, in an embodiment.
Figure 14:
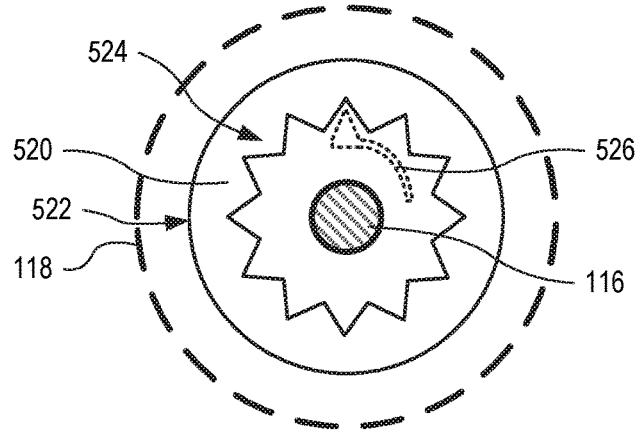
FIG. 14 shows a spool that is integral with the pivot such that the spool rotates as the pivot is turned by the handle, in an embodiment.
Figure 15:
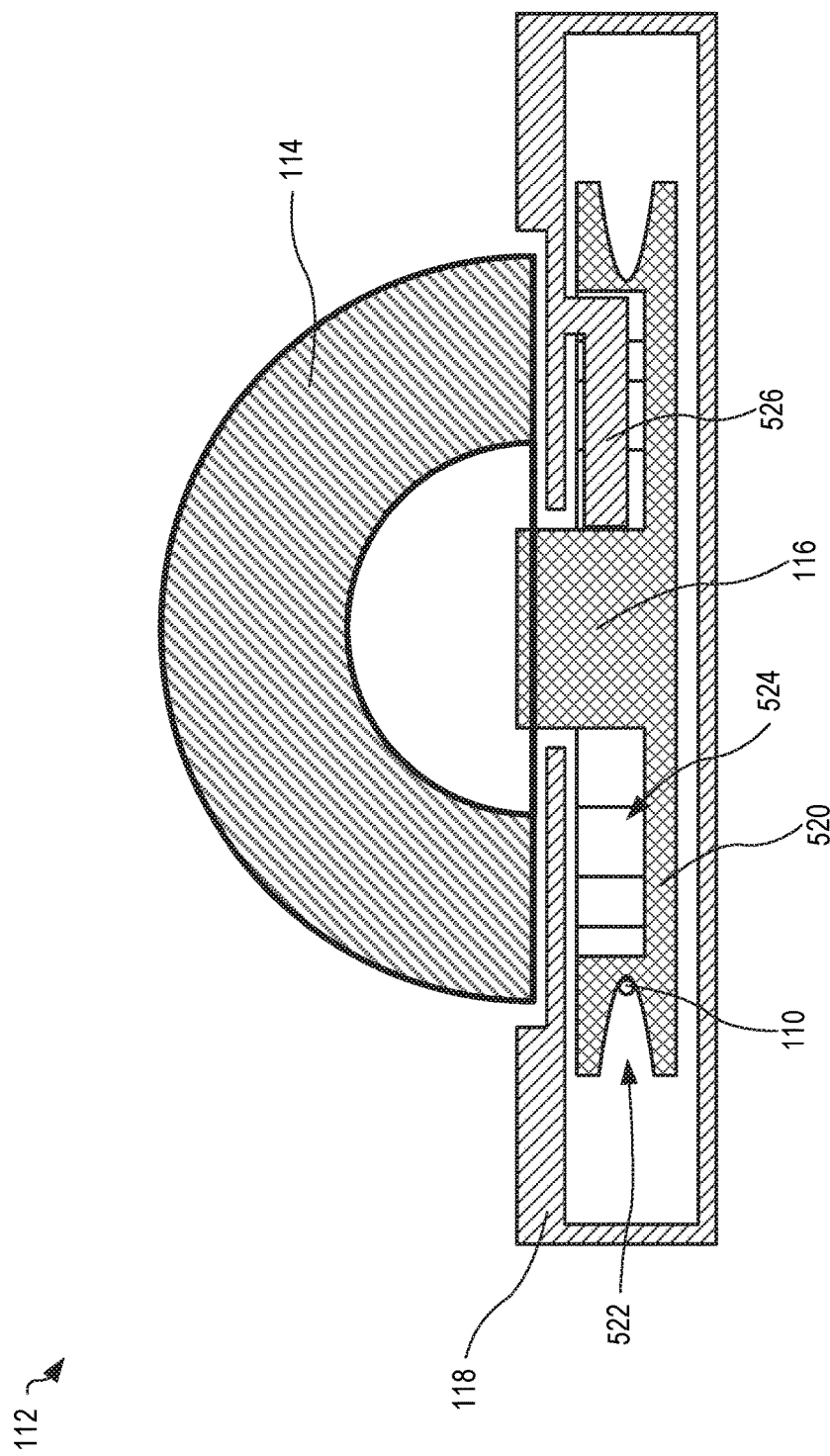
FIG. 15 shows a cross section A-A through the tensioner of FIGS. 13 and 14.

FIG. 13 shows tensioner 112 of the wire mobile device case 100 of FIG. 3B in further example, detail illustrating connectivity to wire 110. FIG. 14 shows a spool 520 that is integral (e.g., molded together or permanently affixed) with pivot 116 such that spool 520 rotates as pivot 116 is turned by handle 114. FIG. 15 shows a cross section A-A through tensioner 112 of FIGS. 13 and 14. FIGS. 13-15 are best viewed together with the following description.

Handle 114 is coupled to a pin 502 that passes through pivot 116, such that handle 114 may fold flat into a recess 504 of outer casing 118. Recess 504 is substantially circular and sized to receive handle 114 when flat, but may include one or more additionally recessed areas 506 to allow the user to move handle 114 from the flat position to a raised position that allows the user to turn handle 114. At least two eyelets 508 are attached to outer casing 118 such that wire 110 may attach thereto. In the embodiment shown in FIG. 13, wire 110 is attached to a first eyelet 508(1) and passes at least twice through each corner piece 102, 104, 106, and 108, and at least once through eyelets 508(2), 508(3), and a second end of wire 110 is attached to spool 520.

Threading

In one embodiment, the first end of wire 110 is attached to eyelet 508(1) of tensioner 112. Wire 110 then enters aperture 412, passes through channel 402, and exists aperture 408 of corner piece 106. Wire 110 then enters aperture 208, passes through channel 202, and exist aperture 204 of corner piece 102. Wire 110 then enters aperture 308, passes through channel 302, and exits aperture 312 of corner piece 104. Wire 110 then passes through eyelet 508(3), and then through eyelet 508(2) of tensioner 112. Wire 110 then enters aperture 318, passes through channel 304, and exits aperture 314 of corner piece 104. Wire 110 then enters aperture 208 of corner piece 108 (assuming corner piece 108 is a rotation of corner piece 102), passes through channel 202 and exits aperture 204. Wire 110 then enters aperture 422, passes through channel 406, and exits aperture 420 of corner piece 106. Wire 110 then enters aperture 216, passes through channel 212, and exits aperture 214 of corner piece 102. Wire 110 then enters aperture 308, passes through channel 322, and exits aperture 322 of corner piece 104. Wire 110 then enters aperture 216, passes through channel 212, and exits aperture 214 of corner piece 108. Wire 110 then enters aperture 414, passes through channel 404, and exits aperture 418 of corner piece 106. Wire 110 then attaches to spool 520 of tensioner 112. Thus, wire 110 is in a single piece that passes twice through corner pieces 102 and 108, passes three times through corner pieces 104 and 106, and is tensioned by tensioner 112 such that corner pieces 102, 104, 106 and 108 are secured to mobile device 150 by forces derived from tension of wire 110 by tensioner 112.

In another embodiment, wire 110 is in two pieces, where a first end of a first piece of wire 110 attaches to eyelet 508(1) and a second end of the first piece of wire 110 attaches to eyelet 508(3). A first end of a second piece of wire 110 attaches to eyelet 508(2) and a second end of the second piece of wire 110 is captured by spool 520 of tensioner 112. Since tensioner 112 applies a force to each of the two pieces of wire 110, thereby creating inward forces to retain corner pieces 102, 104, 106, and 108 on mobile device 150. Other embodiments are envisioned where a first end of wire 110 attaches to a different one of eyelets 508, and where wire 110 passes through the other two eyelets 508 before being captured and tensioned by spool 520 and tensioner 112.

Corner pieces 102, 104, 106, and 108 may be configured with other channels such that threading of wire 100 may take other paths around mobile device 150, without departing from the scope hereof.

Tensioning

Wire mobile device case 100 may use any type of tensioning mechanism without departing from the scope hereof. In the embodiment shown in FIG. 3A, tensioner 112 is implemented as semi-rigid ring 109. Other tensioning mechanism, ratchet mechanisms, and means of tensioning wire 110 may be used without departing from the scope hereof. For example, tensioner 112 may be a metal spring the applies a tensioning force to wire 110. In the embodiment of FIG. 3B, and as shown in FIGS. 13-15, tensioner 112 includes spool 520, which is positioned substantially within outer casing 118 and is sized such that spool 520 may rotate as pivot 116 is turned by handle 114. Spool 520 is formed with an outer channel 522 (see FIG. 15) for receiving wire 110, wherein wire 110 is wound up or unwound as handle 114 is turned. In one embodiment, wire 110 is permanently attached within outer channel 522 of spool 520. Spool 520 has teeth 524 formed on an internal surface that may engage with a ratchet 526 that is movably coupled (e.g., using a spring) to outer housing 118 that prevents spool 520 from rotating unless so actioned by the user turning handle 114. Teeth 524 and ratchet 526 cooperate to form a ratchet mechanism. Other types of ratchet mechanisms may be used without departing from the scope hereof.

Example of Use

In one example of use, wire mobile device case 100 is preconfigured with wire 110 threaded through corner pieces 102, 104, 106, and 108 and attached to tensioner 112 as described above. To attach wire mobile device case 100 to mobile device 150 (or any other similar device), the user positioned each corner piece 102, 104, 106, 108 at a corresponding corner of mobile device 150, and then the user turns handle 114 of tensioner 112 to apply tension to wire 110. Wire 110 slides through channels 202, 212, 304, 304, 306, 402, 404, and 406, to apply inward, with respect to mobile device 150, forces to each corner. The ratchet mechanism (i.e., ratchet 526 and teeth 524) maintains the tension on wire 110 unless handle is turned in an opposite direction to unwind wire 110 from spool 520. The tension of wire 110, and corresponding inward forces, retains corner pieces 102, 104, 106 and 108 on mobile device 150. Wire 110 may be of any suitable material, including but not limited to, copper, stainless steel, nickel, Kevlar, nylon, carbon fiber, plastic, rubber, and so on. In certain embodiments, wire 110 is woven from one or more of these materials. Particular, since wire 110 makes two passes along each side of mobile device 150, between adjacent corner pieces 102, 104, 106, and 108, wire mobile device case 100 is minimalist, functional, and aesthetically pleasing.

Advantageously, corner pieces 102, 104, 106 and 108, wire 110, and tensioner 112 may be adapted to fit a device of any size and of any rectangular shape.

Package Casing

Figure 16:
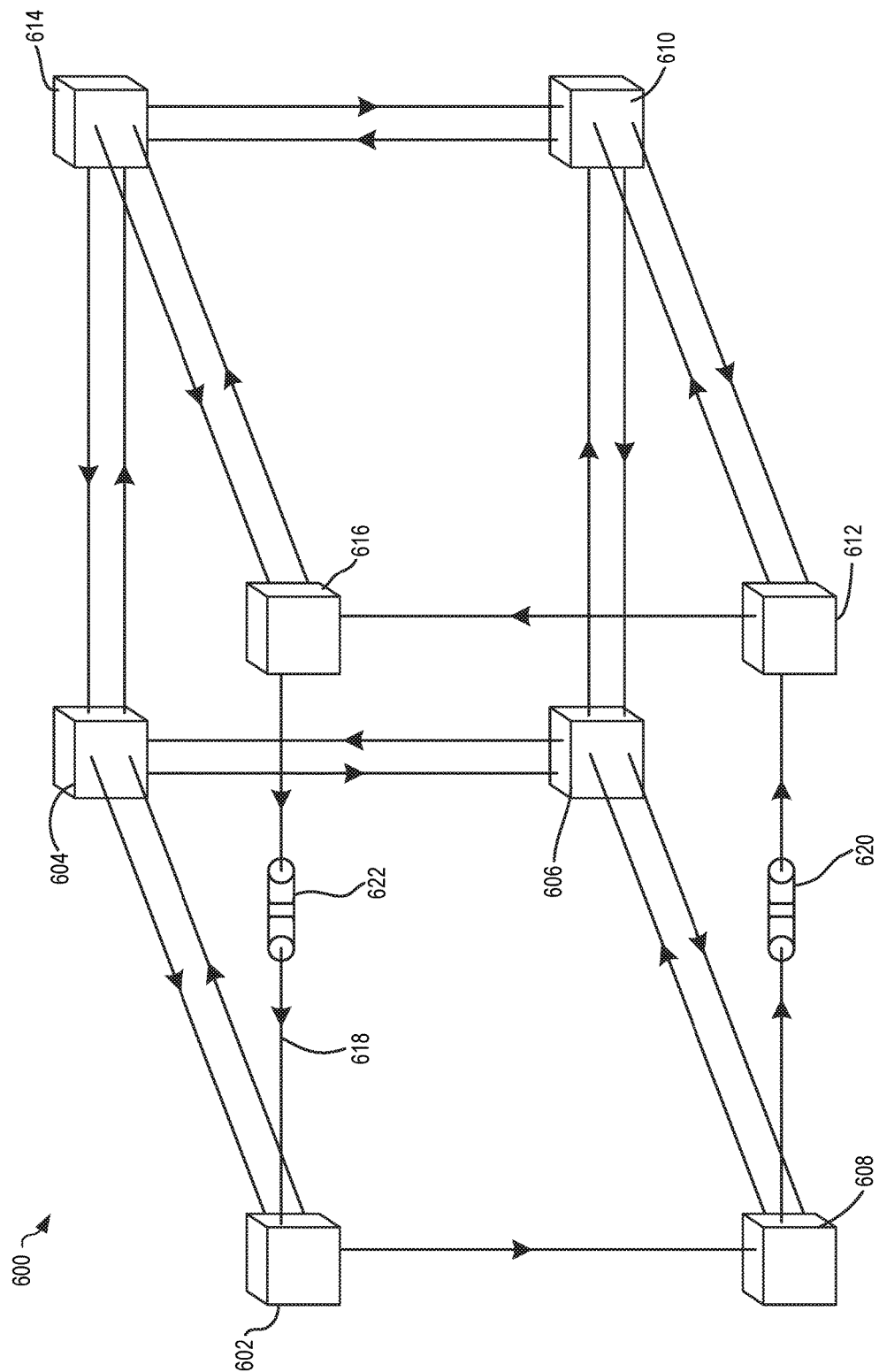
FIG. 16 shows an illustration of one example wire cuboid holder, in an embodiment.

FIG. 16 shows one example for encasing a cuboid shape. Wire cuboid holder 600 is similar to wire mobile case 100 of FIG. 1 and may be used on an enclosure for a package, a box, or other similar shape. Wire cuboid holder 600 includes a wire 618, eight corner pieces 602, 604, 606, 608, 610, 612, 614, and 616, and two cleats 620 and 622. Each corner piece of wire cuboid holder 600 may have any of the features, or combinations thereof, of any corner piece of wire mobile case design 100, including, but not limited to, one or more channels configured to receive and route wire 618. Each corner piece 602, 604, 606, 608, 610, 612, 614, and 616, respectively, may be independently recessed and/or otherwise shaped to fit a corner of a cuboid item (e.g., a package), and thereby facilitate retention of the corner piece on the cuboid item.

Wire 618 may be threaded through corner pieces to form several different paths. In one example of threading, wire 618 enters a first aperture of corner piece 602, passes through a first channel of corner piece 602, and exits a second aperture of corner piece 602. Wire 618 then enters a first aperture of corner piece 604, passes through a first channel of corner piece 604, and exits a second aperture of corner piece 604. Wire 618 then enter a first aperture of corner piece 606, passes through a first channel of corner piece 606, and exits a second aperture of corner piece 606. Wire 618 then enters a third aperture of corner piece 604, passes through a second channel of corner piece 604, and exits a fourth aperture of corner piece 604. Wire 618 then enters a third aperture of corner piece 602, passes through a second channel of corner piece 602, and exits a fourth aperture of corner piece 602. Wire 618 then enters a first aperture of corner piece 608, passes through a first channel of corner piece 608, and exits a second aperture of corner piece 608. Wire 618 then enters a third aperture of corner piece 606, passes through a second channel of corner piece 606, and exits a fourth aperture of corner piece 606. Wire 618 then enters a first aperture of corner piece 610, passes through a first channel of corner piece 610, and exits a second aperture of corner piece 610. Wire 618 then enters a fifth aperture of corner piece 606, passes through a third channel of corner piece 606, and exits a sixth aperture of corner piece 606. Wire 618 then enters a third aperture of corner piece 608, passes through a second channel of corner piece 608, and exits a fourth aperture of corner piece 608. Wire 618 then passes through first cleat 620. Wire 618 then enters a first aperture of corner piece 612, passes through a first channel of corner piece 612, and exits a second aperture of corner piece 612. Wire 618 then enters a third aperture of corner piece 610, passes through a second channel of corner piece 610, and exits a fourth aperture of corner piece 610. Wire 618 then enters a first aperture of corner piece 614, passes through a first channel of corner piece 614, and exits a second aperture of corner piece 614. Wire 618 then enters a fifth aperture of corner piece 610, passes through a third channel of corner piece 610, and exits a sixth aperture of corner piece 610. Wire 618 then enters a third aperture of corner piece 612, passes through a second channel of corner piece 612, and exits a fourth aperture of corner piece 612. Wire 618 then enters a first aperture of corner piece 616, passes through a first channel of corner piece 616, and exits a second aperture of corner piece 616. Wire 618 then enters a third aperture of corner piece 614, passes through a second channel of corner piece 614, and exits a fourth aperture of corner piece 614. Wire 618 then enters a fifth aperture of corner piece 604, passes through a third channel of corner piece 604, and exits a sixth aperture of corner piece 604. Wire 618 then enters a fifth aperture of corner piece 614, passes through a third channel corner piece 614, and exits a sixth aperture of corner piece 614. Wire 618 then enters a third aperture of corner piece 616, passes through a second channel of corner piece 616, and exits a fourth aperture of corner piece 616. Wire 618 then passes through second cleat 622. Wire 618 then enters the first aperture of corner piece 602, thereby forming a continuous loop.

In certain embodiments, after wire 618 is threaded (e.g., as described above), ends of wire 618 are joined and/or tied together, such that wire 618 is a continuous loop without ends. Examples of joining of ends of wire 618 include chemical fusing, such as via a reaction with a solvent, or physically fusing, such as via heat and/or pressure. Tension in wire 618 provides resulting inward forces at each of corner pieces 602-616, thereby retaining the corner pieces on a cuboid item. Tightening or increasing tension of wire 618, such as at each of cleats 620 and 622, increases the inward forces at each of the corner pieces.

In other embodiments of wire cuboid holder 600, wire 618 is in two pieces, wherein each, or any combination, of ends of the two pieces of wire 618 may be fused to one of the corner pieces, one of the cleats, or two another end of a wire piece of 618.

Figure 17A:
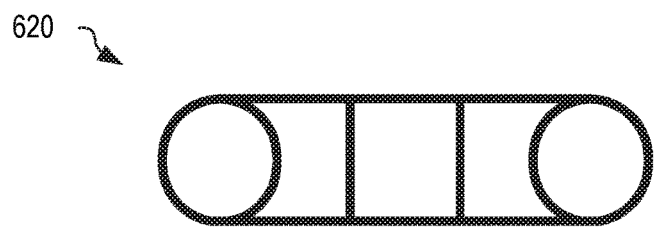
FIG. 17A shows a top view of an example cleat.
Figure 17B:
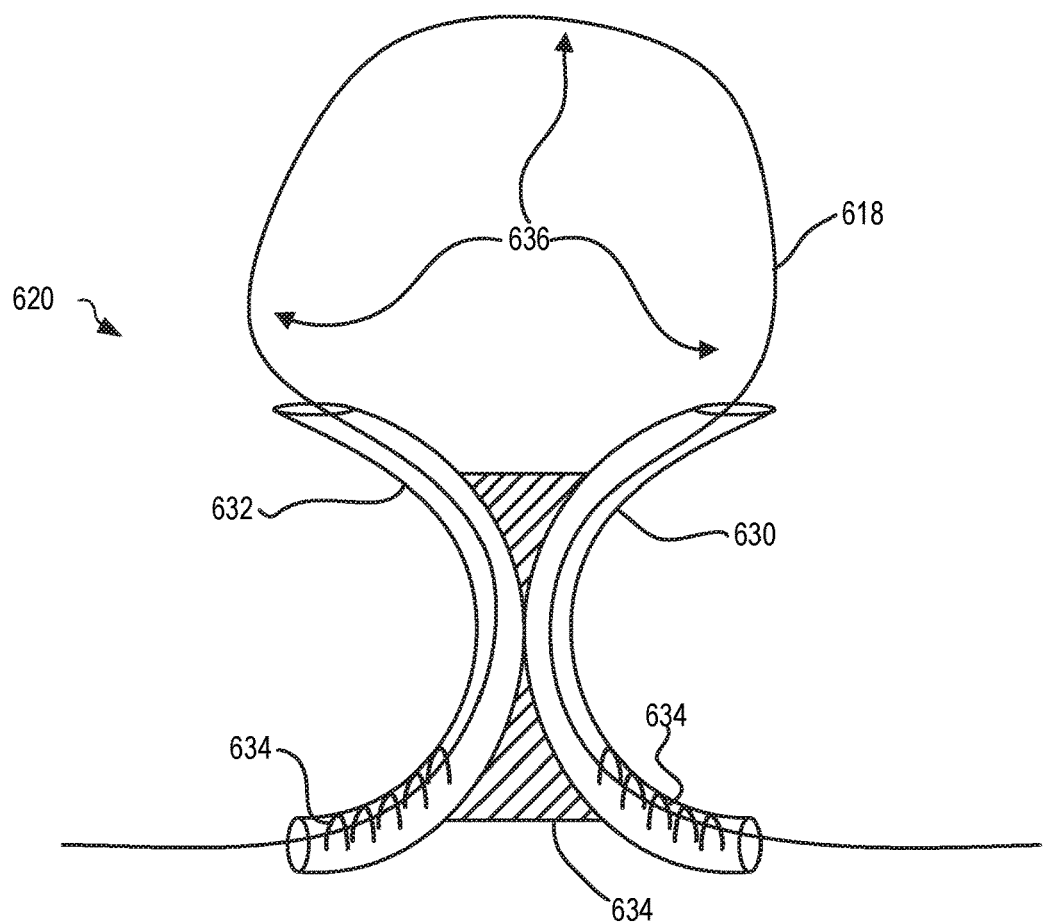
FIG. 17B shows an oblique front view of the cleat of FIG. 17A.

In an embodiment, FIG. 17A illustrates a top view and FIG. 17B illustrates a front view of cleat 620. In an embodiment, cleats 620 and 622 are identical. As depicted in FIG. 17B, cleat 620 includes first and second curved cleat tubes or channels 630 and 632 supported by a cleat supporting structure 634. Within one or both cleat tubes 630 and 632 are a plurality of teeth 634. For example, teeth 634 are v-shaped relief features inside cleat tubes 630. As illustrated in FIG. 17B, wire 618 (i) passes into a first (bottom) open end of first cleat tube 630, (ii) passes out a second (top) open end of cleat tube 630, (iii) forms a loop 636, (iv) passes into first end (top) of cleat second cleat tube 632, and (v) passes out a second end (bottom) of cleat tube 632. The size of loop 636 is adjusted according to application. For example, a single rod may be fitted through loop 636 of each of cleats 620 and 622 to hold a package supported by wire cuboid holder 600. Teeth 634 hold wire 618 in place when upward pressure (bottom to top as drawn in FIG. 17B) is applied to wire loop 636, such as when a package is held via wire loop 636. Wire cuboid holder 600 may be tightened around the cuboid object, such as a package, by increasing the size of loop 636, for example, at each cleat to make wire 618 taught around the object being held.

In certain embodiments, each of corner pieces 602, 604, 606, 608, 610, 612, 614, and 616 are formed of rubber, plastic, or metal. Any channel within any corner piece may include the same material(s) as the channels of wire mobile case design 100, such as channel 202. In an embodiment, wires 100 and 618 each may be independently a cord, a rope or a cable. Wires 100 and 618 each may be independently formed of metal, synthetic fiber, natural fiber, or any combination of these. Synthetic fiber includes carbon fiber and/or a plastic material having, for example, nylon, polyester, polypropylene, and/or aramid. Natural fiber includes, for example, hemp, sisal, cotton, flax, and/or jute. Wires 100 and 618 each may be independently solid, stranded, braided, twisted, and/or plaited. The diameter of each of wires 100 and 618 is independently selected to be suitable for the chosen application and may depend, for example, upon the weight of the item being held (e.g., mobile phone or package).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A wire device case, comprising:
   four corner pieces configured to be positioned at each corner of the device;
   a tensioner configured to be positioned at a back of the device and between the four corner pieces; and
   a single wire having a first end attached to the tensioner, passing through each of the four corner pieces, and having a second end captured and tensioned by the tensioner, the tensioned wire configured to create an inward force, with respect to the orientation of the four corner pieces, to retain the four corners on the device;
   each of a first two of the four corner pieces positioned opposing to one another having two channels therethrough, the wire passing through each of the two channels of each of the first two corner pieces.

2. The wire device case of claim 1, the channels being formed by a metal sleeve.

3. The wire device case of claim 1, each of the other of the four corner pieces having three channels therethrough, the wire passing through each of the three channels of each of the other two corner pieces.

4. The wire device case of claim 3, the channels being formed by a metal sleeve.

5. The wire device case of claim 1, the wire comprising one or more materials selected from the group including copper, stainless steel, nickel, Kevlar, nylon, carbon fiber, plastic, and rubber.

6. The wire device case of claim 5, the wire being woven from one or more materials.

7. The wire device case of claim 1, the tensioner comprising a stretchable material for applying an inward force to tension the wire.

8. A wire cuboid object case, comprising:
eight corner pieces for positioning at each corner of a cuboid object;
a tensioner positioned between any two of the eight corner pieces; and
a wire passing through channels in each of the eight corner pieces and the tensioner, the tensioned wire creating an inward force, with respect to the orientation of the eight corner pieces, to retain the eight corners on the cuboid object;
wherein each of the corner pieces has at least two channels.

9. The wire cuboid object case of claim 8, the tensioner being a cleat.

10. The wire cuboid object case of claim 9, the cleat having teeth to releasably capture the wire within the cleat and maintain tension on the wire.

11. The wire cuboid object case of claim 10, the wire passing through the cleat to form a loop, the cleat configured to tension the wire via adjustment of the loop size, during use.

12. The wire cuboid object case of claim 11, further comprising a second tensioner, the wire passing through each of the two tensioners.

13. The wire cuboid object case of claim 12, the loops for the first and second tensioners forming a handle for carrying the cuboid object.

14. The wire cuboid object case of claim 8, the wire having a single continuous length.

15. A wire cuboid object case, comprising:
eight corner pieces for positioning at each corner of a cuboid object;
a tensioner positioned between any two of the eight corner pieces; and
a wire passing through channels in each of the eight corner pieces and the tensioner, the tensioned wire creating an inward force, with respect to the orientation of the eight corner pieces, to retain the eight corners on the cuboid object;
wherein the tensioner is a cleat, the cleat having teeth to releasably capture the wire within the cleat and maintain tension on the wire.

16. The wire cuboid object case of claim 15, the wire passing through the cleat to form a loop, the cleat configured to tension the wire via adjustment of the loop size, during use.

17. The wire cuboid object case of claim 16, further comprising a second tensioner, the wire passing through each of the two tensioners.

18. The wire cuboid object case of claim 17, the loops for the first and second tensioners forming a handle for carrying the cuboid object.

19. The wire cuboid object case of claim 15, the wire having a single continuous length.

* * * * *